United States Patent
Yamaguchi et al.

(10) Patent No.: US 8,113,140 B2
(45) Date of Patent: Feb. 14, 2012

(54) POWDER COATING APPARATUS AND POWDER COATING METHOD

(75) Inventors: Masayuki Yamaguchi, Tochigi (JP); Haruhisa Kaiju, Aichi (JP)

(73) Assignee: Honda Motor Co., Ltd, Tokyo (JP)

( * ) Notice: Subject to any disclaimer, the term of this patent is extended or adjusted under 35 U.S.C. 154(b) by 416 days.

(21) Appl. No.: 12/251,134

(22) Filed: Oct. 14, 2008

(65) Prior Publication Data

US 2009/0110816 A1  Apr. 30, 2009

(30) Foreign Application Priority Data

Oct. 31, 2007  (JP) .............................. P.2007-283692

(51) Int. Cl.
*B05B 15/12* (2006.01)
*B05B 15/04* (2006.01)
*B05C 19/04* (2006.01)

(52) U.S. Cl. .......... 118/309; 118/308; 118/326; 118/70; 454/50

(58) Field of Classification Search .................. 118/308, 118/309, 326, 324, 70, DIG. 7; 454/50, 53; 55/DIG. 46; 427/180
See application file for complete search history.

(56) References Cited

U.S. PATENT DOCUMENTS

| 4,932,316 A | | 6/1990 | Josefsson |
| 5,061,510 A | | 10/1991 | Nussbaumer et al. |
| 5,152,839 A | * | 10/1992 | Boyce et al. .................. 118/309 |
| 5,259,879 A | | 11/1993 | Khattab et al. |
| 5,421,885 A | | 6/1995 | Trevisan |
| 5,906,676 A | * | 5/1999 | Drummond ..................... 95/273 |

FOREIGN PATENT DOCUMENTS

| DE | 36 40 699 A1 | 6/1988 |
| JP | 01-207155 A | 8/1989 |
| JP | 05-185017 A | 7/1993 |
| JP | 06-320079 A | 11/1994 |
| JP | 2000-093860 A | 4/2000 |
| JP | 2004 167366 A | 6/2004 |

* cited by examiner

*Primary Examiner* — Yewebdar Tadesse
(74) *Attorney, Agent, or Firm* — Arent Fox LLP (57) ABSTRACT

A powder coating apparatus is provided with: a coating booth, wherein a work to be coated is moved by a conveyer in the coating booth; and a coating gun that sprays powder coating material to the moving work. In the powder coating apparatus, the coating booth includes a movable wall on at least one of a side wall and a ceiling wall of the coating booth. The movable wall is configured to move in accordance with the work passing the coating booth.

3 Claims, 11 Drawing Sheets

POWDER COATING APPARATUS AND POWDER COATING METHOD

BACKGROUND OF THE INVENTION

1. Field of the Invention

The present invention relates to a powder coating apparatus including a powder coating booth and a powder coating method. More particularly, the invention relates to an apparatus and a method of powder coating which can prevent a powder coating material from dispersing and recover the powder coating material that has been over-sprayed.

2. Background Art

Powder coating does not use organic solvent, and the powder coating attracts attention as a coating means for not polluting environment. Therefore, the powder coating has been recently adopted, widely from guard rails which are one of materials for public equipment, to lighting devices which are one of materials for home-use. Especially, the powder coating is adopted for under-coating or top coat (clear coating) of cars. The powder coating is said to be friendly to the environment of the earth.

In order to prevent the powder coating material from dispersing and recover the over-sprayed powder material, the powder coating is executed in a coating booth.

Therefore, the powder coating material is different from the solvent coating material and it is possible to recover and reuse the over-sprayed powder coating material. Accordingly, the powder coating material is seldom wasted when it is used, that is, the powder coating material is friendly to the environment of the earth.

Although the powder coating material can be recovered and reused as described above, dust may be mixed in the powder coating material. A coating failure may be generated due to the dust, at the time of reusing it. Therefore, it is desirable to enhance an adhesion efficiency by one coat of the powder coating material as high as possible.

In order to reduce a quantity of over-sprayed powder coating material as small as possible and enhance the adhesion efficiency by one coat of the powder coating material, some countermeasures have been conventionally taken. For example, positioning and setting of coating guns in the coating booth is devised. Moreover, a discharge of the powder coating material from the coating guns is controlled.

The powder coating is executed in such a manner that the powder coating material is sprayed from the coating guns to the work to be coated passing in the coating booth.

Fundamentally, dimensions of the coating booth are decided according to a size and a shape of the work. However, in the case where a plurality of types of works, the dimensions of which are different from each other, are coated, it is not practical to prepare a plurality of coating booths respectively having dimensions suitable for the plurality of works, due to limitations of space.

Therefore, in the case where a plurality of works, the dimensions and shape of which are different from each other, are coated in one coating line, it is necessary to decide a volume of the coating booth so that the volume of the coating booth can agree with the largest work. Accordingly, for example, in the case where a small work is coated, the volume of the coating booth is too large with respect to the dimensions of the small work and the adhesion efficiency of the power coating material with respect to the work is not good. Therefore, most of the discharged powder coating material is recovered as over-sprayed powder coating material by an over-sprayed powder collector. That is, in many cases, a powder coating operation is executed under a condition that dimensions of works and a volume of the coating booth do not agree with each other.

SUMMARY OF THE INVENTION

One or more embodiments of the invention provide an apparatus and a method of powder coating for reducing a quantity of over-sprayed powder coating material by adapting a volume of a coating booth to the most appropriate value according to dimensions of works to be coated so that an adhesion efficiency of a powder coating material with respect to a work can be enhanced, even if a plurality of types of works, the dimensions and shapes of which are different from each other, are coated in a single coating line.

In accordance with one or more embodiments of the invention, a powder coating apparatus is provided with: a coating booth, wherein a work to be coated is moved by a conveyer in the coating booth; and a coating gun that sprays powder coating material to the moving work. In the powder coating apparatus, the coating booth includes a movable wall on at least one of a side wall and a ceiling wall of the coating booth, and the movable wall is configured to move in accordance with the work passing the coating booth.

In the powder coating apparatus, the movable wall may be provided on the side wall, and an inner width of the coating booth may be changed in accordance with the work passing the coating booth.

In the powder coating apparatus, the side wall may be divided into a first portion and a second portion in a moving direction of the work, and the movable wall may be provided on one of the first portion and the second portion.

In the powder coating apparatus, the movable wall may be provided on the ceiling wall, and a ceiling height of the coating booth may be changed in accordance with the work passing the coating booth.

The powder coating apparatus may further include an over-sprayed powder collector connected to the coating booth, and the over-sprayed powder collector may be configured so that a volume of suction of the over-sprayed powder collector is adjusted in accordance with an inner volume of the coating booth.

Moreover, in accordance with one or more embodiments of the invention, a powder coating method includes: moving a work to be coated in a coating booth; spraying powder coating material to the work by a coating gun; and moving a movable wall on at least one of a side wall and a ceiling wall of the coating booth, in accordance with the work passing the coating booth.

The powder coating method may further include changing an inner width of the coating booth in accordance with the work passing the coating booth, by moving the movable wall provided on the side wall.

In the powder coating method, the side wall may be divided into a first portion and a second portion, and the movable wall may be provided on one of the first portion and the second portion.

The powder coating method may further include changing a ceiling height of the coating booth in accordance with the work passing the coating booth, by moving the movable wall provided on the ceiling wall.

The powder coating method may further include adjusting a volume of suction of an over-sprayed powder collector connected to the coating booth in accordance with an inner volume of the coating booth.

According to the apparatus and method of the embodiments of the invention as described above, at least one of the side wall and the ceiling wall of the coating booth is movable. Therefore, it is possible to adjust an inner volume of the coating booth to the most appropriate value by changing the inner width or the ceiling height of the coating booth according to the work passing in the coating booth. Therefore, the adhesion efficiency of spraying the coating material to the work is enhanced and a quantity of over-sprayed powder coating material is reduced.

Other aspects and advantages of the invention will be apparent from the following description, the drawings and the claims.

DETAILED DESCRIPTION OF THE EXEMPLARY EMBODIMENTS

Exemplary embodiments of the present invention will be explained as follows.

First Embodiment

FIGS. 1 to 4 are views showing a first embodiment in which right and left sidewalls 2, 3 of a coating booth 1 are respectively structured as movable walls capable of moving in a lateral direction which is perpendicular to a moving direction of a work A in the coating booth 1. An inner width of the coating booth 1 is changed according to a dimension of the work A to be coated passing in the coating booth 1 so that an inner volume can be adjusted to the dimensions of the work A.

Figure 1:
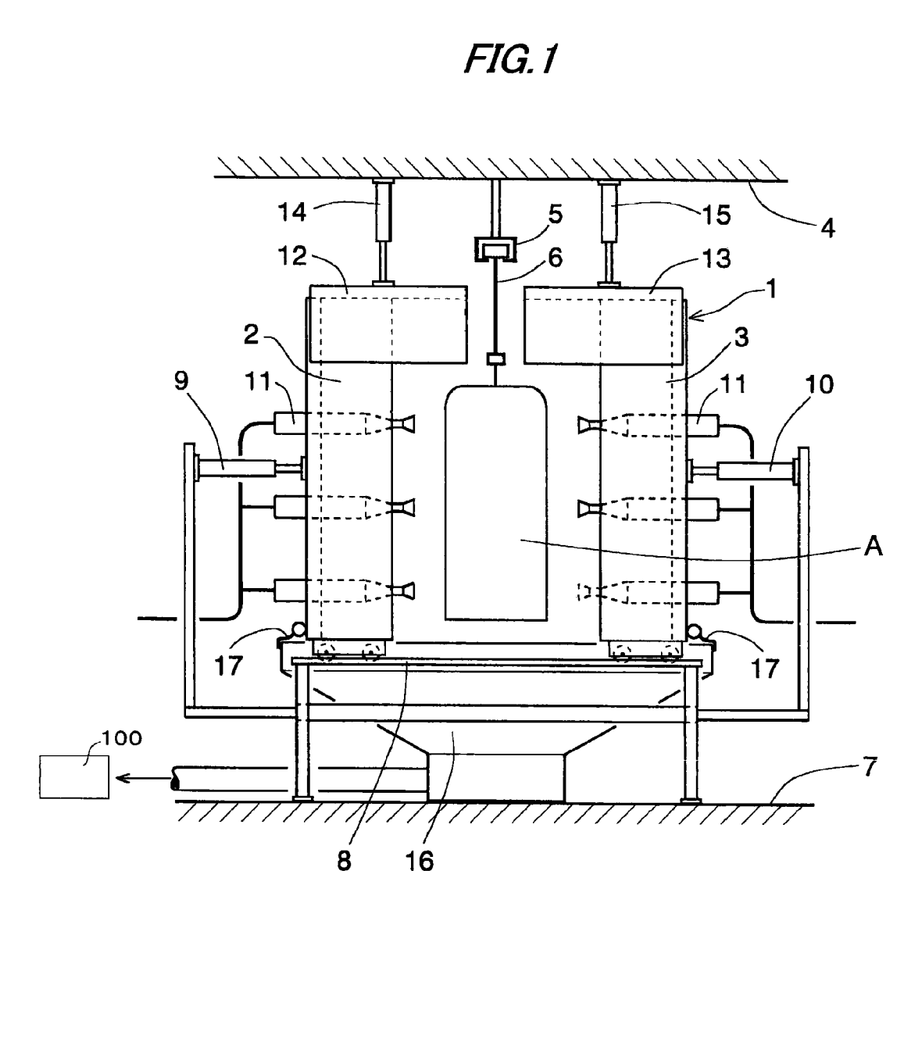
FIG. 1 is a front view showing a first embodiment of the powder coating apparatus of the present invention.
Figure 2:
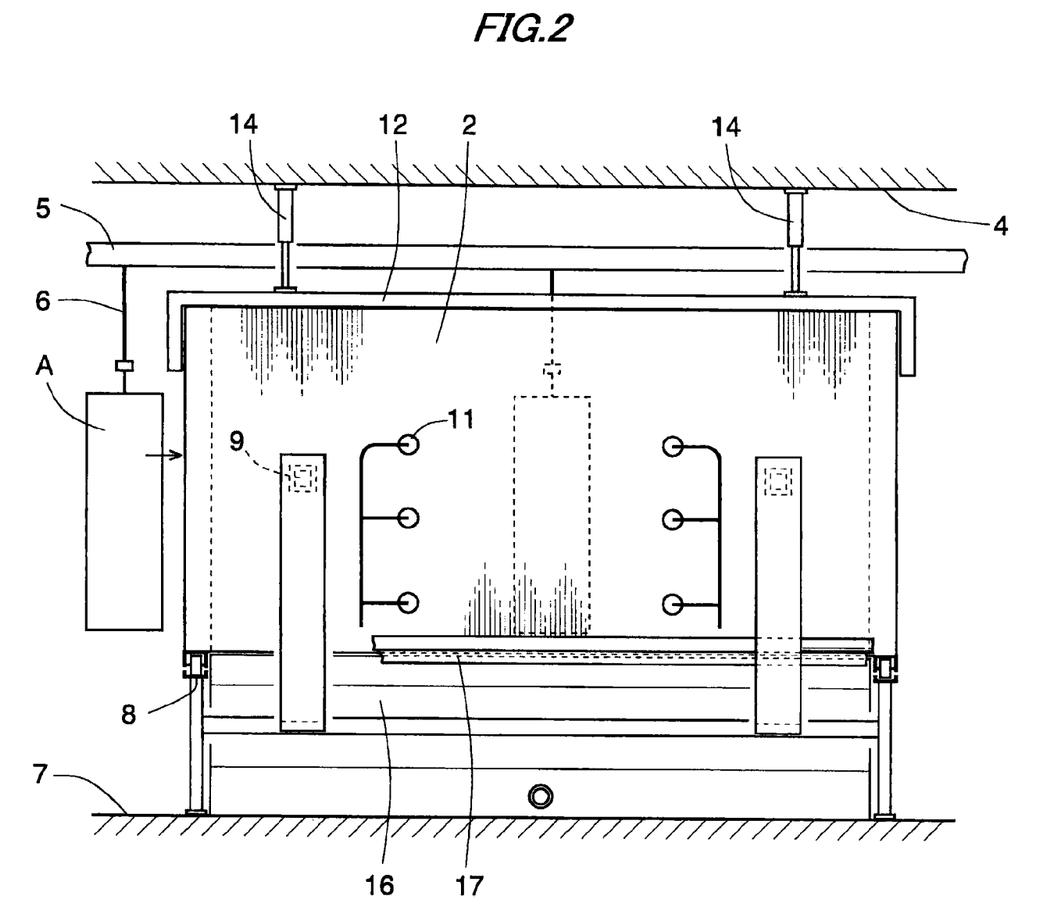
FIG. 2 is a side view of the powder coating apparatus of FIG. 1.

The right and left side walls 2, 3 of the coating booth 1 are arranged on both sides of the work A which moves while being hung by a hanger 6 of a conveyer 5 arranged on a ceiling 4 of a building. To front and rear of the right and left side walls 2, 3, an entrance board and an exit board are integrally attached.

The right and left side walls 2, 3 are capable of moving along a rail 8 arranged on a floor 7 so that the right and left side walls 2, 3 can be close to or separate from the work A.

Figure 3A:
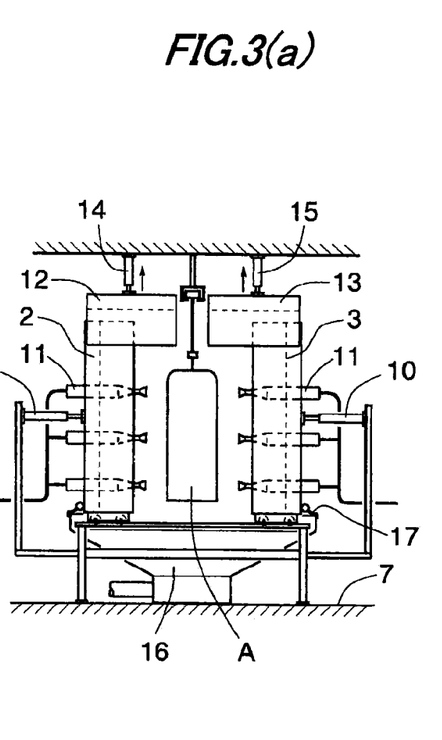
FIGS. 3(a), 3(b) and 3(c) are front views showing a procedure of moving side walls in the first embodiment.
Figure 3B:
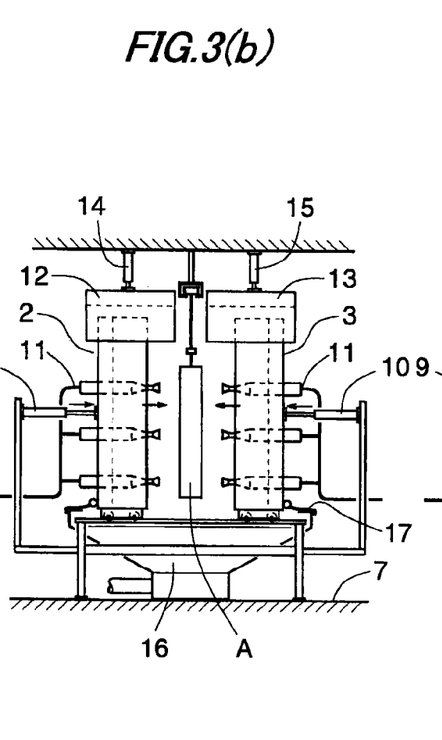
Figure 3C:
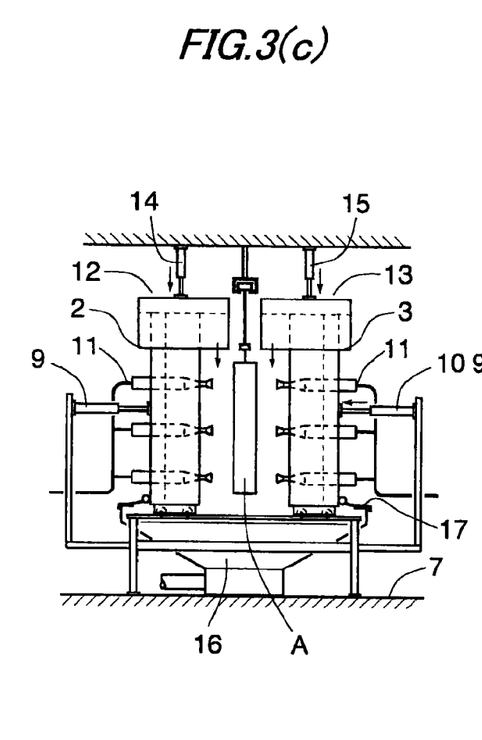

As shown in FIG. 1, when a lateral width of the work A is large, the right and left side walls 2, 3 move outward so that an inner width of the coating booth 1 can be extended. On the contrary, as shown in FIGS. 3(b), 3(c), when the lateral width of the work A is small, the right and left side wall 2, 3 move inward so that the inner width of the coating booth 1 can be reduced. Thereby, the right and left side wall 2, 3 can adapt a volume of the chamber to the work A.

The right and left side walls 2, 3 are actuated when rods of pistons 9, 10 arranged outside of the side walls 2, 3 extend and contract.

In the first embodiment, three coating guns 11 are respectively arranged on the right and left side walls 2, 3. The coating guns 11 move in the lateral direction together with the right and left side walls 2, 3, so that a distance between the work A and the coating gun 11 can be adjusted.

Above the right and left side walls 2, 3, ceiling walls 12, 13 are respectively arranged so that upper faces of the right and left side wall 2, 3 can be closed by the ceiling walls 12, 13. These ceiling walls 12, 13 are hung from the ceiling 4 of the building through the pistons 14, 15. When rods of the pistons 14, 15 are contracted, as shown in FIGS. 3(a) and 3(b), the ceiling walls 12, 13 are separated from the upper end portions of the right and left side walls 2, 3. When the rods of the pistons 14, 15 are extended, the ceiling walls 12, 13 are contact with the upper end portions of the right and left side walls 2, 3, so that no gap can be formed between the right and left side walls 2, 3 and the ceiling walls 12, 13.

The reason why the ceiling walls 12, 13 can elevate type as described above in the first embodiment is that, if the right and left side walls 2, 3 and the ceiling walls 12, 13 are contact with each other during moving the right and left side walls 2, 3 in the lateral direction, the right and left sidewalls 2, 3 collide with the ceiling walls 12, 13 and movements of the right and left sidewalls 2, 3 is obstructed. Accordingly, during moving the right and left side walls 2, 3 in the lateral direction, the rods of the pistons 14, 15 are contracted and as shown in FIGS. 3(a) and 3(b), and the ceiling walls 12, 13 are separated from the upper end portions of the right and left side walls 2, 3. After the completion of the movements, as shown in FIG. 3(c), the rods of the pistons 14, 15 are extended and the ceiling walls 12, 13 are contact with the upper end portions of the right and left side walls 2, 3, so that gaps formed between the right and left side walls 2, 3 and the ceiling walls 12, 13 can be closed.

On a floor face of the coating booth 1, a suction hopper 16 for recovering over-sprayed coating material powder is arranged along the moving direction of the work A. It is preferable that a quantity of suction sucked by an over-sprayed powder collector 100 through the suction hopper 16 is adjusted according to an inner volume of the coating booth 1. When the right and left side walls 2, 3 are extended and the inner volume of the coating booth is extended, the quantity of suction is increased. When the inner volume of the coating booth is reduced, the quantity of suction is decreased.

Figure 4A:
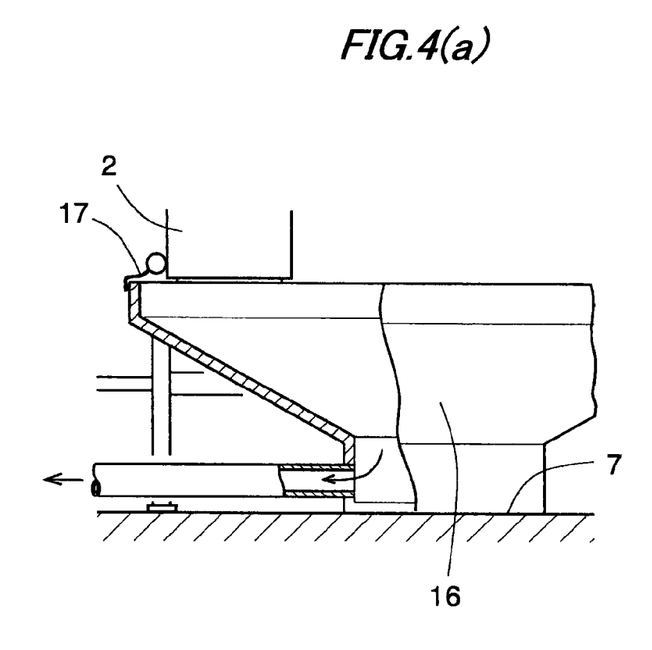
FIGS. 4(a) and 4(b) are partial sectional views showing a relation between a suction hopper and lower end portions of side walls at the time of moving the side walls in the first embodiment.
Figure 4B:
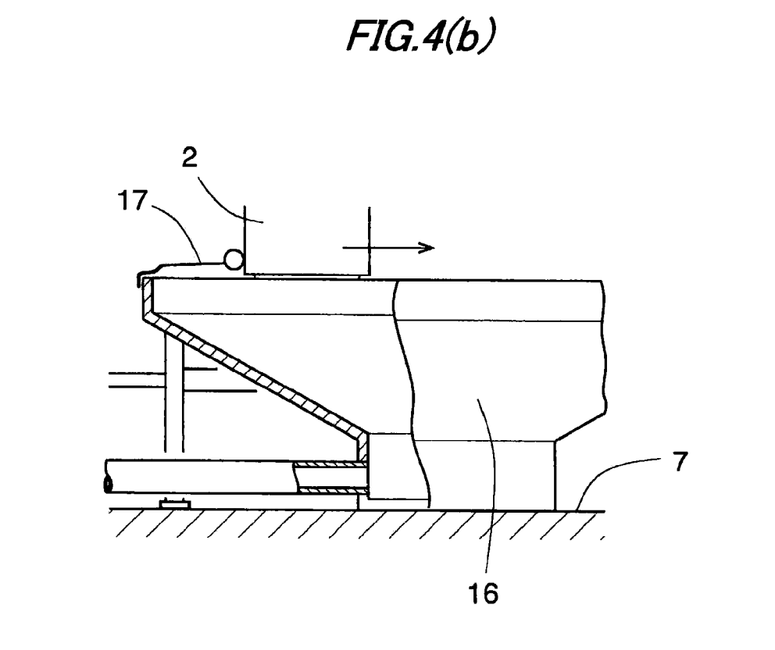

The lateral width of an upper end portion of the suction hopper 16 is the same as a width at which the right and left side walls 2, 3 are extended outward as wide as possible. Therefore, when the right and left side walls 2, 3 are moved inward, spaces are formed between both side portions of the upper end of the suction hopper 16 and the lower end portions of the right and left side walls 2, 3. Accordingly, in order to close these spaces, as shown in FIGS. 4(a), 4(b), between both side portions of the upper end of the suction hopper 16 and the lower end portions of the right and left side walls 2, 3, a winding type covers 17 which can extend and contract according to a movements of the right and left side walls 2, 3 are provided.

As described above, although an inner height of the coating booth 1 shown in FIGS. 1 to 4 is constant, by moving the right and left side walls 2, 3, an inner width of the coating booth 1 can be adjusted.

This adjustment of the inner width of the coating booth may be automatically made as follows. Before the work A arrives to the coating booth 1, the lateral width of the work A is detected by a sensor. According to a result of a detection, the rods of the pistons 14, 15 of the ceiling walls 12, 13 and the rods of the pistons 9, 10 of the right and left side walls 2, 3 are moved, so that the width of the right and left side walls 2, 3 can be previously adjusted to the width of the work A.

In the first embodiment, a piston mechanism is used for a drive means for moving the right and left side walls 2, 3. However, the drive means is not limited to the above specific embodiment. A ball screw mechanism or a chain mechanism may be used for the drive means.

The right and left side walls 2, 3 and the ceiling walls 12, 13 may be made of a non-conductive resin panel made of polypropylene (PP).

Second Embodiment

Figure 5:
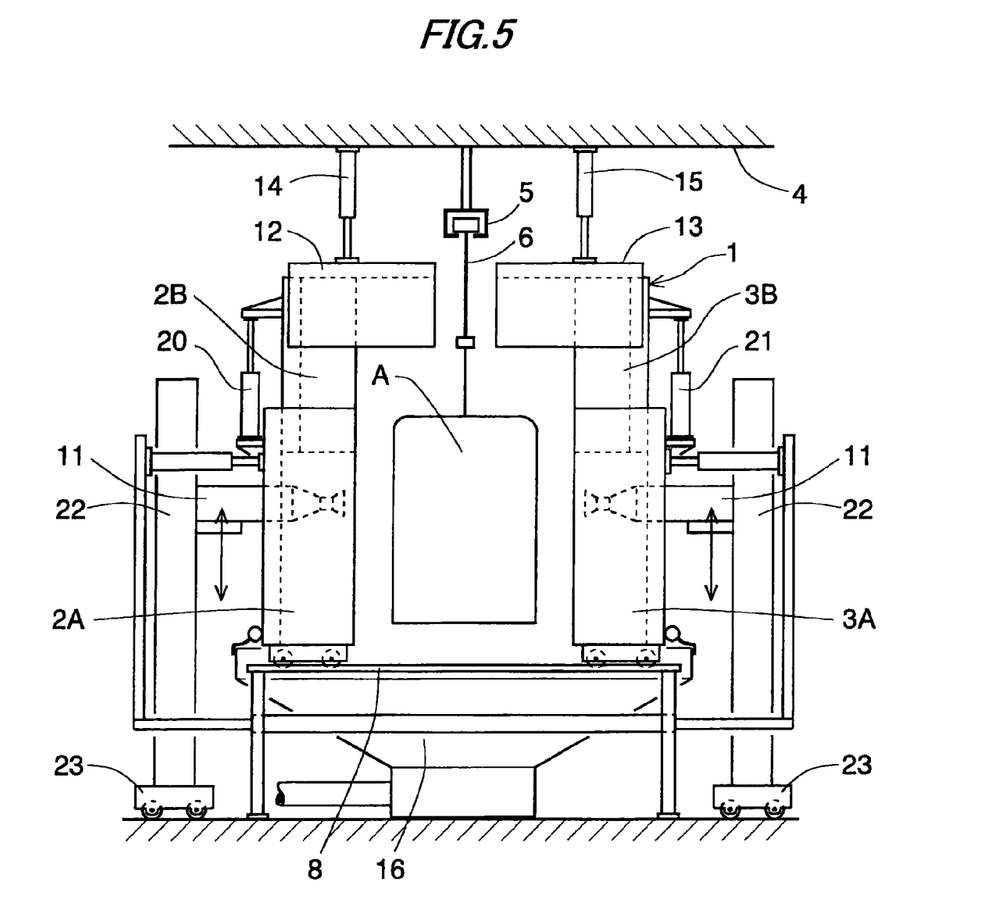
FIG. 5 is a front view showing a second embodiment of the powder coating apparatus of the present invention.

FIGS. 5 and 6 are views showing a second embodiment. In the second embodiment, an inner volume of the coating booth is adapted to the dimensions of the works A by changing both the inner width and the inner height of the coating booth 1.

In explanations of the second embodiment, parts in common with the first embodiment shown in FIGS. 1 to 4 are indicated by the same reference numerals.

In the second embodiment, the moving mechanism of moving the right and left side walls 2, 3 in the lateral direction and the elevating mechanism of elevating the ceiling walls 12, 13 are the same as the mechanisms of the first embodiment. A different point of the second embodiment from the first embodiment is that heights of the right and left side walls 2, 3 can be changed according to an elevating motions of the ceiling walls 12, 13 so that an inner height of the coating booth 1 can be changed by elevating the ceiling walls 12, 13 with the pistons 14, 15. The heights of the right and left side walls 2, 3 are adjusted by dividing the right and left side walls 2, 3 into lower walls 2A, 3A and upper walls 2B, 3B. The upper walls 2B, 3B are elevated with respect to the lower walls 2A, 3A by the pistons 20, 21, which are arranged on the lower walls 2A, 3A.

In the second embodiment, the coating guns 11 are arranged in the reciprocators 22 for moving the coating guns 11 in a vertical direction. The reciprocators 22 are arranged on a pedestal 23 having wheels and can also move in the lateral direction.

In the second embodiment, the right and left side walls 2, 3 move and the ceiling walls 12, 13 elevate as follows.

FIG. 5 is a view showing a state in which the right and left side walls 2, 3 are maximally expanded outward and the ceiling walls 12, 13 are raised upward so that the inner volume of the coating booth 1 is maximized at the time of coating the largest work A. At the time of coating the small work A to be coated as shown in FIGS. 6(a) to 6(d), the state is changed from the above state in such a manner that the right and left side walls 2, 3 and the ceiling walls 12, 13 are moved as follows.

Figure 6A:
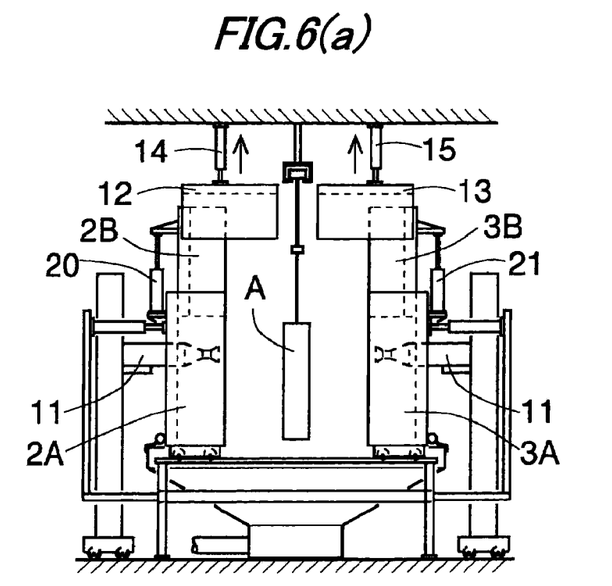
FIGS. 6(a), 6(b), 6(c) and 6(d) are front views showing a procedure of moving side walls and ceiling walls in the second embodiment.
Figure 6B:
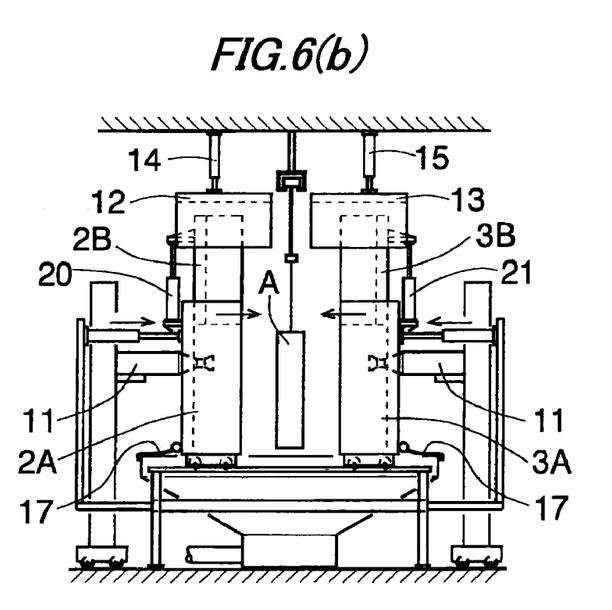
Figure 6C:
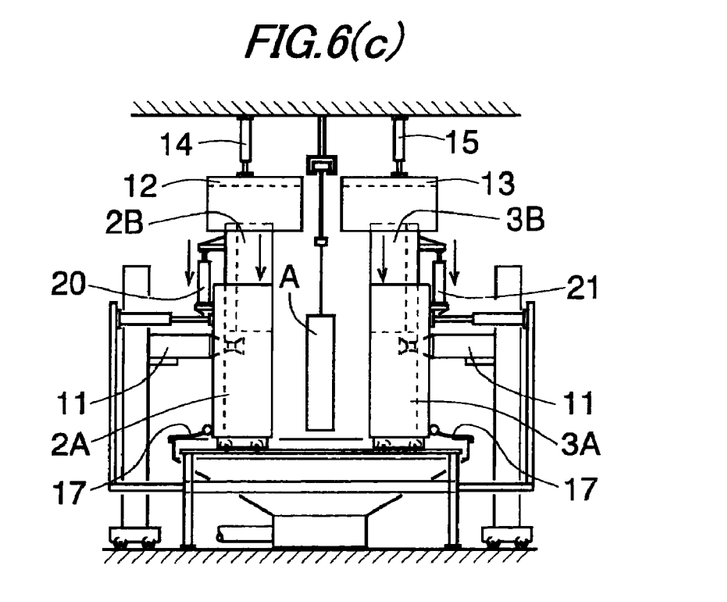
Figure 6D:
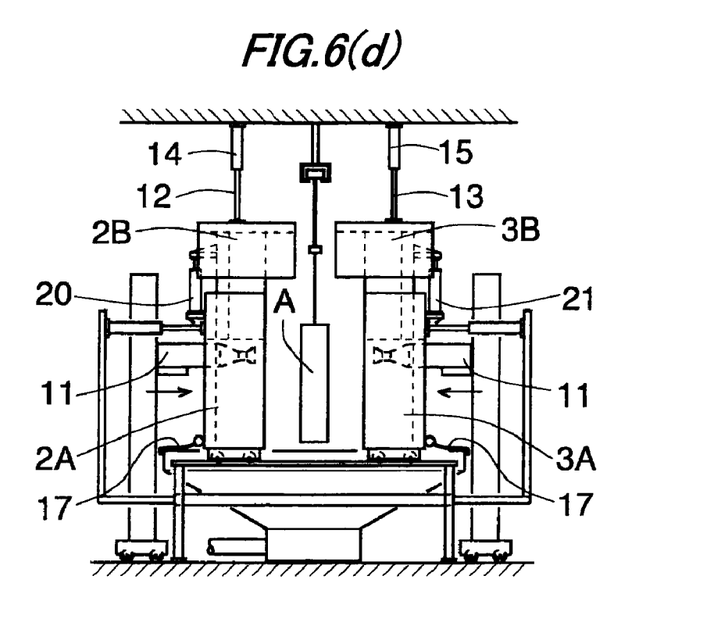

First, as shown in FIG. 6(a), the ceiling walls 12, 13 are raised upward a little so that movements of the right and left sidewalls 2, 3 in the lateral direction cannot be obstructed by the ceiling walls 12, 13. After that, as shown in FIG. 6(b), the rods of the pistons 9, 10 extend and the right and left side walls 2, 3 move inward so that they can agree with the small work A. In order to adjust the heights of the ceiling walls 12, 13 to the height of the small work A, as shown in FIG. 6(c), the upper walls 2B, 3B are lowered by the pistons 20, 21 with respect to the lower walls 2A, 3A, so that the heights of the right and left side walls 2, 3 can be reduced. Then, the ceiling walls 12, 13 are lowered as shown in FIG. 6(d). In this way, gaps formed between upper end portions of the upper walls 2B, 3B and the ceiling walls 12, 13 are closed.

After that, as shown in FIG. 6(d), the reciprocators 22 are moved inward so that they can agree with the small work A and a distance between the coating guns 11 and the small work A can be adjusted.

Third Embodiment

Figure 7:
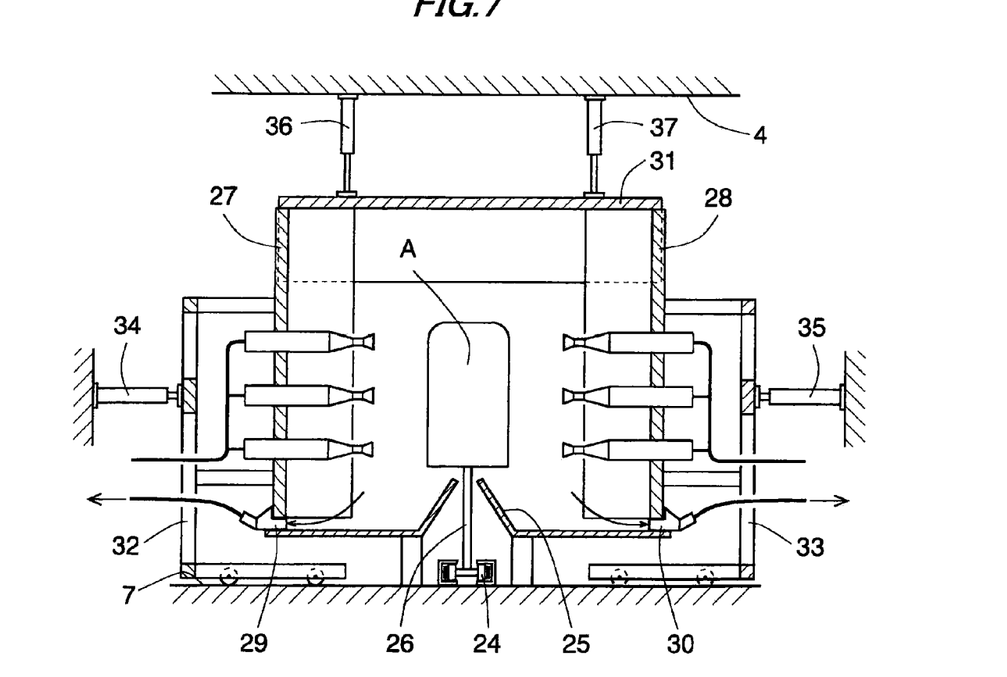
FIG. 7 is a front view showing a state in which side walls are expanded in a third embodiment of the powder coating apparatus of the present invention.
Figure 8:
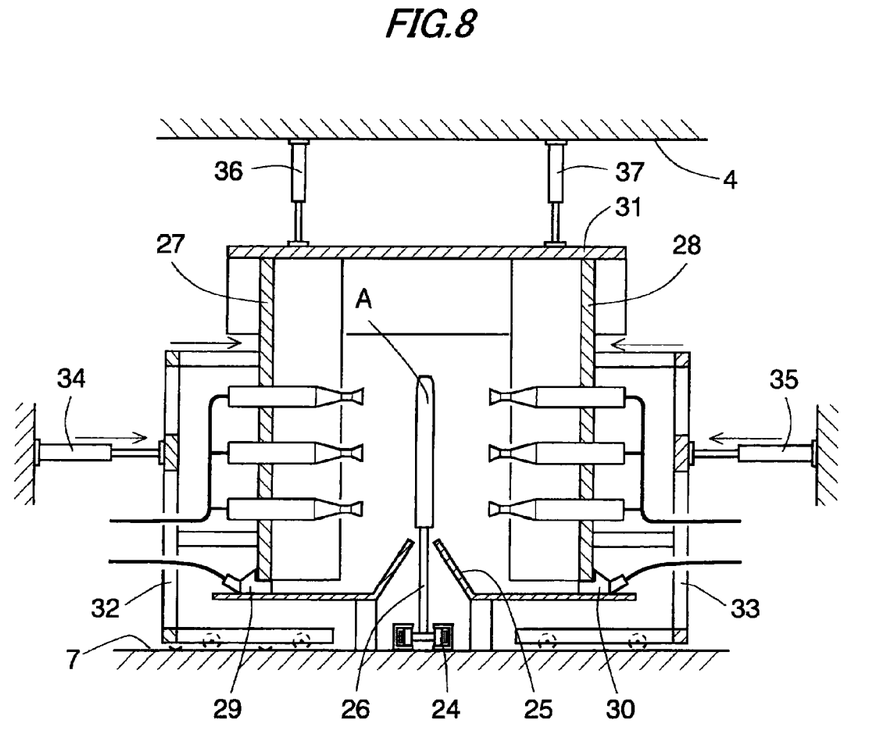
FIG. 8 is a front view showing a state in which side walls are contracted in the third embodiment of the powder coating apparatus of the present invention.
Figure 9:
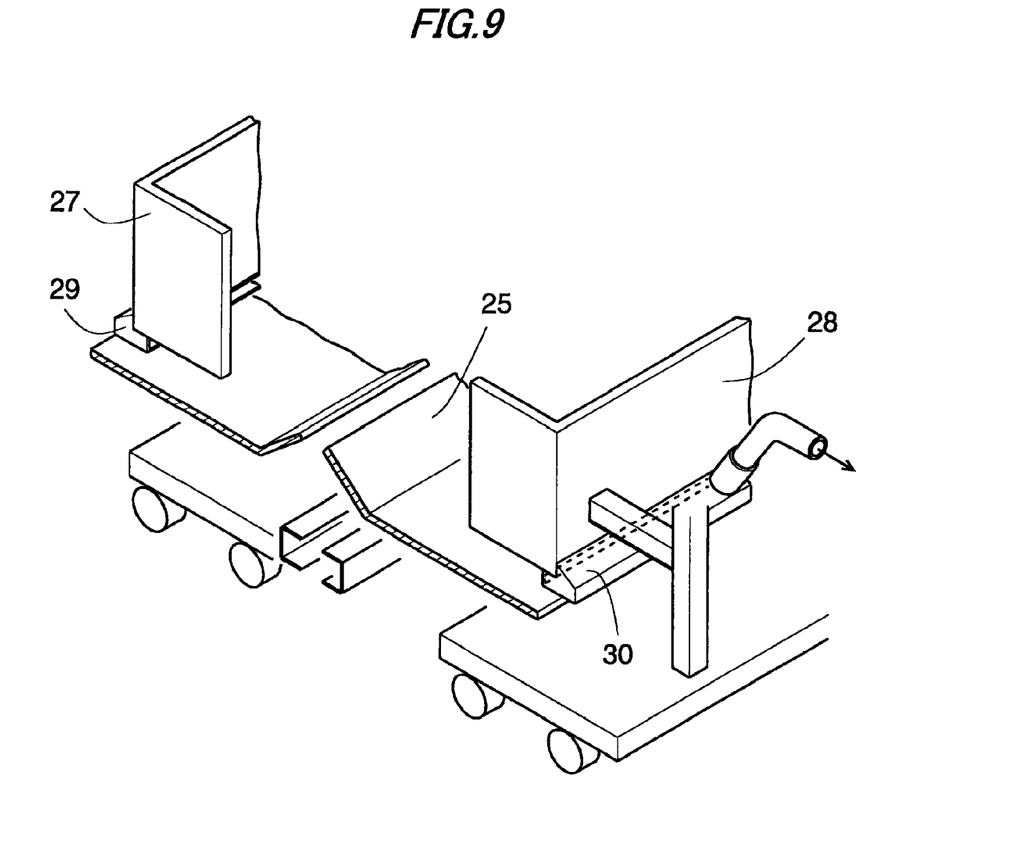
FIG. 9 is a perspective view showing a bottom face portion of the third embodiment of the powder coating apparatus of the present invention.

FIGS. 7, 8 and 9 are views showing a third embodiment in which the right and left side walls 2, 3 of the coating booth 1 are structured as the movable walls capable of moving in the lateral direction in the same manner as that of the first embodiment. By moving the movable walls, the inner width of the coating booth 1 is changed according to the dimension of the work A passing in the coating booth 1. In this way, the inner volume of the coating booth is adapted to the dimension of the work A in the third embodiment.

In the first embodiment, the work A is hung by the hanger 6. However, in the third embodiment, a conveyer 24 for conveying the work A is arranged on a floor face and a support 26 for supporting the work A is moved in a central portion of the floor face 25 of the coating booth 1. Exhaust ducts 29, 30 are integrally arranged along lower end edges of side walls 27, 28.

The side walls 27, 28 are supported by frames 32, 33 having wheels and capable of moving in the lateral direction by pistons 34, 35 integrally with the exhaust ducts 29, 30. FIG. 7 is a view showing a state in which the side walls 27, 28 expand agreeing with the large work A. FIG. 8 is a view showing a state in which the side walls 27, 28 contract agreeing with the small work A.

In the third embodiment, the ceiling walls 31 are supported being hung so that they can elevate by pistons 36, 37.

Figure 10:
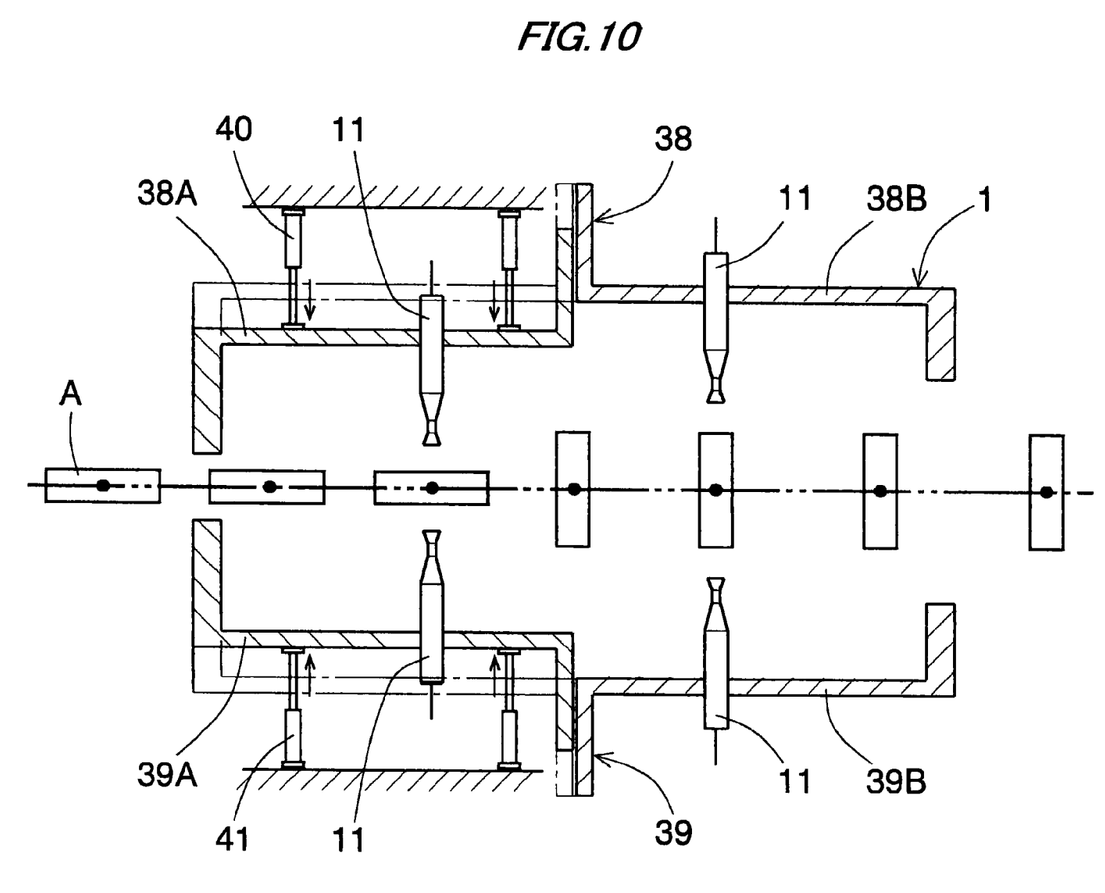
FIG. 10 is a plan view showing a fourth embodiment of the powder coating apparatus of the present invention.

FIG. 10 is a view showing the fourth embodiment in which the side walls 38, 39 of the coating booth 1 are divided into two portions, one is a first half portion and the other is a second half portion, in the moving direction of the work A. The side walls 38A, 39A of the first half portion are capable of moving inward by pistons 41 with respect to the side walls 38B, 39B of rear half portion.

In the fourth embodiment, the work A is turned by 90° in a middle of movement in the moving direction and both sides of the work A are coated in the first half portion and both end faces of the work A are coated in the second half portion. In the first half portion of the coating booth 1, the width of the work A is small. Therefore, the side walls 38A, 39A in the first half portion move inward agreeing with the width of the work A so as to reduce a distance between the work A and the side walls 38A, 39A.

In the fourth embodiment, the coating guns 11 are respectively arranged in the first half portion and the second half portion of the coating booth 1 being opposed to each other.

While description has been made in connection with specific embodiments and modified examples of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF REFERENCE NUMERALS AND SIGNS

1 Coating booth
2, 3 Side wall
4 Ceiling
5 Conveyer
6 Hanger
7 Floor
8 Rail
9, 10 Piston
11 Coating gun
12, 13 Ceiling wall
14, 15 Piston
16 Suction hopper
17 Cover
2A, 3A Lower wall
2B, 3B Upper wall
20, 21 Piston
22 Reciprocator
23 Pedestal
24 Conveyer
25 Floor face
26 Support
27, 28 Side wall
29, 30 Exhaust duct
31 Ceiling wall
32, 33 Frame having wheels
34, 35, 36, 37 Piston
38A, 39A, 38B, 39B Side wall

What is claimed is:

1. A powder coating apparatus comprising:
a coating booth, wherein a work to be coated is moved by a conveyer in the coating booth; and
a coating gun that sprays powder coating material to the moving work,
wherein the coating booth includes a side wall and a ceiling wall,
wherein the side wall is configured to move in accordance with the work passing the coating booth,
wherein the ceiling wall is configured to be elevated relative to the side wall, and
wherein the powder coating apparatus further comprises a first rod and piston coupled with the ceiling wall and a second rod and piston coupled with the side wall, wherein the first rod and piston is configured to move the ceiling wall and the second rod and piston is configured to move the side wall.

2. The powder coating apparatus according to claim 1, wherein the ceiling wall is configured to be separated from an upper end portion of the side wall by contracting the rod and piston.

3. The powder coating apparatus according to claim 2, wherein the ceiling wall is configured to be in contact with the upper end portion of the second moveable wall by extending the first rod and piston.

* * * * *